Sept. 22, 1936.  R. BISCHOFF  2,055,193
PRESSURE SURGE CONTROLLING MEANS
Filed July 26, 1934
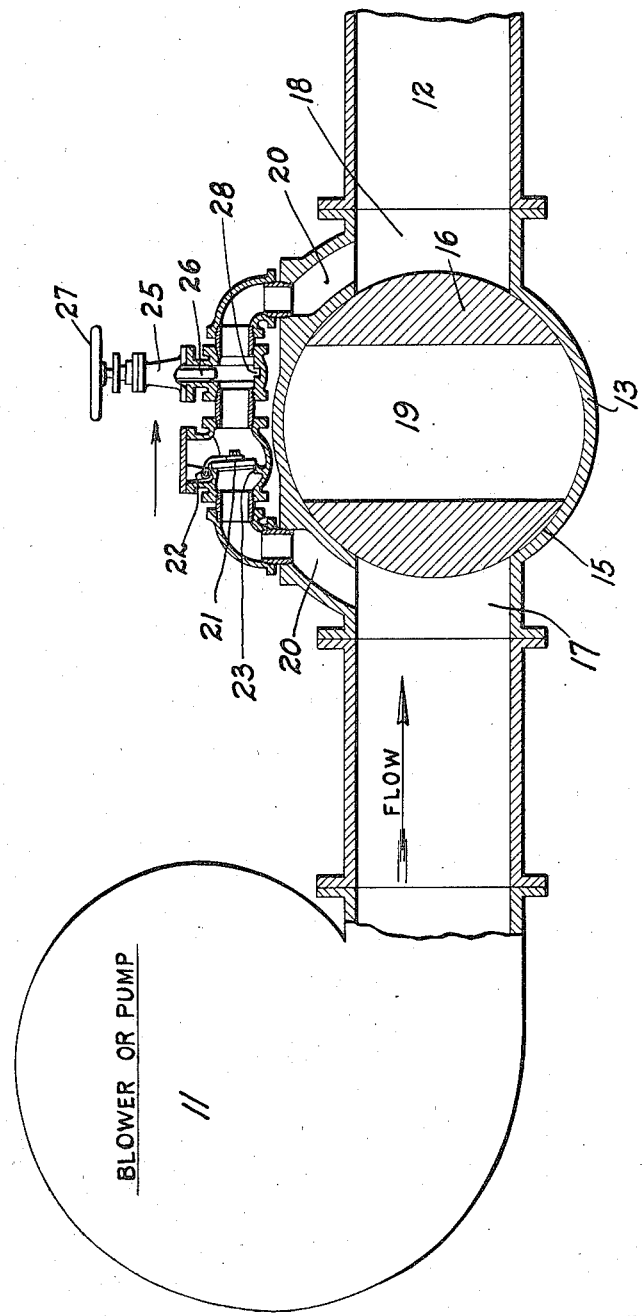
INVENTOR
ROBERT BISCHOFF
BY
Malcolm N. Gannett
ATTORNEY Patented Sept. 22, 1936

2,055,193

UNITED STATES PATENT OFFICE 2,055,193

PRESSURE SURGE CONTROLLING MEANS

Robert Bischoff, York, Pa., assignor to S. Morgan Smith Company, York, Pa., a corporation of Pennsylvania Application July 26, 1934, Serial No. 736,999

1 Claim. (Cl. 230—115)

The present invention relates to means for controlling surges in fluid conveying pipe lines, and is especially adapted for use with fluid systems including fluid propelling mechanism, a conduit leading from the fluid propelling mechanism, and a valve device for controlling the flow of fluid through the conduit.

In fluid systems including propelling mechanisms such as blowers or pumps, and the like, it has been the practice to install in the conduits leading from the pressure side of the fluid propelling mechanisms, valve devices or similar means for controlling the flow of fluid through the conduits. Generally speaking, these valve devices function as check valves, so that when the fluid propelling mechanisms are stopped, the valve devices will automatically close the conduits and prevent back pressure of the fluid from reaching the fluid propelling mechanisms. This is necessary, because it is well known that upon the stopping of a fluid propelling mechanism it is necessary to have some means for preventing a reverse flow of the fluid, as such reverse flow of the fluid causes the fluid propelling mechanism to reverse its rotation, with resultant damage to the bearings and other parts thereof.

Heretofore, it has been proposed to employ a quick acting type of check valve for controlling the flow of fluid delivered by a fluid propelling mechanism to a pipe line or conduit. These check valves have been mostly of the swing or disc check types, having either single or multiple ports.

In actual practice the disc type of check valve, when used for the above mentioned purpose, has been found to have certain disadvantages, in that, (1) there is a very appreciable loss of pressure through this type of check; (2) the disc type check valve is not very tight, thereby making it necessary to also install a shut-off valve in the conduit; and, (3) the disc type check valve is not positive, the opening of the valve depending upon the creation of flow through the valve and the closing of the valve depending upon the cessation of such flow.

Furthermore, disc type check valves require periodical attention and overhauling. If this is not attended to at regular intervals the valves will not close properly when the fluid propelling mechanism is shut down, thereby permitting the fluid to flow back to the fluid propelling mechanism and cause the same to reverse its rotation, with resultant damage thereto.

In order to provide means for obviating all the above adverse conditions, it has been proposed to substitute an automatically operable plug valve for the quick acting type of check valve heretofore installed in the conduit on the pressure side of a fluid propelling mechanism. By employing a plug valve there is no loss of pressure because, first, with the plug in open position, there is a straight, open passage, equal in area to a pipe of the same length; second, a plug valve is tight when closed and therefore an additional shut-off valve is not required; and, third, the automatically operable plug valve is positive in action, because it is pressure operated and it does not require periodical overhauling.

However, in fluid systems of the above type having an automatically operable plug valve for controlling the flow of fluid from the fluid propelling mechanism, when the fluid propelling mechanism is first started the plug valve is not sufficiently sensitive in operation to check surges and pulsations in the conduit and thereby enable the fluid propelling mechanism to quickly take on load and attain its proper speed for delivering fluid at the desired pressure to the conduit.

An object of the present invention is to provide means for by-passing fluid from the pressure side of a fluid propelling mechanism so as to suppress surges and pulsations in the conduit on the pressure side of the fluid propelling mechanism while the fluid propelling mechanism is taking on load, prior to the operation of the main control valve to wide open position.

Another object of the invention is to provide means for by-passing fluid from the pressure side of a fluid pressure system of the above type so that the surges are damped out almost immediately.

Another object of the invention is to provide means for by-passing fluid from the conduit on the pressure side of a fluid pressure system of the above type so that a predetermined amount of fluid is by-passed around the main control valve before the main control valve on the discharge side of the fluid propelling mechanism is opened.

Another object of the invention is to provide an improved means for controlling the flow of fluid through a fluid pressure system of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing the single figure is a diagrammatic view, partly in section, of a fluid pressure system embodying the present invention.

Referring to the drawing, the apparatus may comprise a blower or pump 11 of any desired type, from the pressure side of which there leads a pipe, main, or conduit 12. The blower or pump 11 may be used for forcing fluids, such as air, gases, etc., or liquids, such as water, etc., through the conduit 12.

Mounted in the conduit 12 and adapted to control the fluid delivered thereto by the blower or pump 11, is a valve device 13, also of any approved type. If so desired valve 13 may be of the automatically operating type.

The valve 13 has a cavity 15 formed therein for a plug 16. The cavity 15 is intersected by a longitudinal water way or opening which constitutes passages 17, 18 through the valve, the passage 17 being on one side of the cavity 15 and the passage 18 being on the other side of said cavity. The plug 16 has a passage 19 formed therein. The passages 17, 18 and 19 are of the same diameter, so that when the plug 16 is in the open position, a uniform bore will extend through the valve from end to end.

According to the present invention a by-pass 20 connects the conduit 12 on one side of the valve 13 with the conduit 12 on the other side of said valve. The flow area of by-pass 20 is somewhat smaller than the area of conduit 12 but sufficient for the purpose, as will be hereinafter described.

Communication through by-pass 20 is controlled by a check valve 21 pivotally mounted as at 22, and adapted to swing in the direction of flow through the by-pass as indicated by the arrow in the drawing, in order to permit fluid to flow around the main control valve 13 as will be hereinafter more fully described. Normally check valve 21 is seated against its seat 23 and thereby cuts off communication through by-pass 20.

Also installed in the by-pass 20, is a gate valve 25. Obviously any suitable type of valve device may be here employed, but in the instant case, a manually operable type of gate valve is shown. However, valve devices of other forms may also be employed when so desired. As shown, valve 25 has a gate 26, the position of which is controlled by a hand wheel or other operating means 27. The main body of the valve 25 is formed with a seat 28 for the gate 26 when the latter is in closed position. Normally, the gate 26 is raised to its wide open position as is shown in the drawing.

In operation, and assuming that the blower or pump 11 has been shut down and it is desired to start the blower or pump for the purpose of delivering fluid under pressure to the conduit 12, the plug 16 of automatically operable control valve device 13 will be in the closed position shown in the drawing, in which position fluid in conduit 12 on the right hand side of valve 13 is prevented from flowing back to the blower or pump 11.

When the blower or pump 11 is first started the fluid under pressure in conduit 12 on the blower side of closed control valve 13 will flow into by-pass 20 and open check valve 21, which action permits the fluid to flow around control valve 13 and into conduit 12 on the opposite side thereof. Since the communication through by-pass 20 is controlled by a check valve 21 which automatically opens upon an increase in pressure and automatically closes upon a drop in pressure, and since a surge consists of a series of pressure rises and drops, the check valve 21 opens and closes until the surges resulting from the initial operation of the blower or pump 11 are smoothed out. In this way a predetermined quantity of fluid under pressure from blower or pump 11 is by-passed around the closed main control valve 13.

After the blower or pump 11 has taken on load sufficiently so that the pressure of the fluid delivered therefrom equals or overbalances the back pressure of the fluid in conduit 12, the main control valve device 13 is opened so that fluid under pressure from the blower or pump will be delivered through passages 17, 19 and 18 to the conduit 12. When the valve device 13 is fully opened, the check valve 21 in by-pass 20 seats against its seat 23, due to the balanced pressures in by-pass 20 on both sides of valve 21, thereby cutting off communication through by-pass 20.

By by-passing fluid from the pressure side of the blower or pump 11 around valve device 13 while the blower or pump is taking on load, surges and pulsations resulting from fluid flowing through valve 13 while the plug 16 thereof is partly open, will be dissipated and not transmitted back to the blower or pump.

It will also be understood that any means may be provided for automatically actuating the main control valve device 13, since many types of valve devices suitable for this purpose are readily purchasable on the market. However, since some of these valve devices are not sensitive enough in their operation to function so that surges and pulsations are not produced, it will be appreciated that it is necessary to have additional means which are operable independently of the main valve device for relieving the surges and pulsations resulting from the operation of the blower or pump at certain times, such for instance as when the blower or pump is initially started when communication through the conduit is cut off by the main control valve device 13.

After the pressure of the fluid has been built up the desired amount and the blower or pump is operating at normal load, and the main valve device 13 is open wide, the surges and pulsations which set up vibrations in the apparatus when the blower or pump is attaining its rated capacity, have disappeared. During the normal operation of the apparatus the main control valve device 13 remains open, and upon the shutting down of the apparatus, said valve device is adapted to automatically close and cut off communication through the conduit 12. However, when it is desired to again start the blower or pump, in order to prevent the formation of surges and pulsations, it is necessary to first by-pass the fluid from the blower or pump around valve 13 in the manner heretofore described before the blower or pump has taken on load great enough to effect the automatic operation of the valve 13 so as to reestablish communication through the conduit 12.

Should it be necessary at any time to remove check valve 21 for repair or replacement, the gate 26 of valve 25 can be moved to its seat 28 thereby cutting off communication through by-pass 20. After check valve 21 has been again installed in the by-pass, the gate valve can be opened thereby permitting the check valve 21 to control communication through by-pass 20.

Having thus described my invention, what I claim is:—

In a device of the class described, the combination with a centrifugal fluid propelling mechanism and a conduit leading from the pressure side of said mechanism, of means for permitting said centrifugal fluid propelling mechanism to take on load and attain a normal operating speed from an inactive condition without producing surges of the fluid in the conduit, comprising a rotary plug valve for controlling communication through the conduit, the free fluid passage through the valve being of substantially the same diameter as the internal diameter of the conduit, and means for by-passing fluid from said centrifugal fluid propelling mechanism around the rotary plug valve when the plug of said valve is closed and said mechanism is taking on load and attaining the normal operating speed, comprising a passageway of smaller area than the area of said conduit, a check valve for controlling communication through said passageway, said check valve being operable only to permit the flow of fluid through the passageway in a direction to relieve the pressure of the fluid on the pressure side of said centrifugal fluid propelling mechanism when said rotary plug valve is closed, said plug valve being adapted to be opened when said mechanism has taken on load.

ROBERT BISCHOFF.